R. SPURGIN, Jr.
BELT SHIFTER.
APPLICATION FILED FEB. 23, 1918.
1,415,271.
Patented May 9, 1922.
3 SHEETS—SHEET 3.
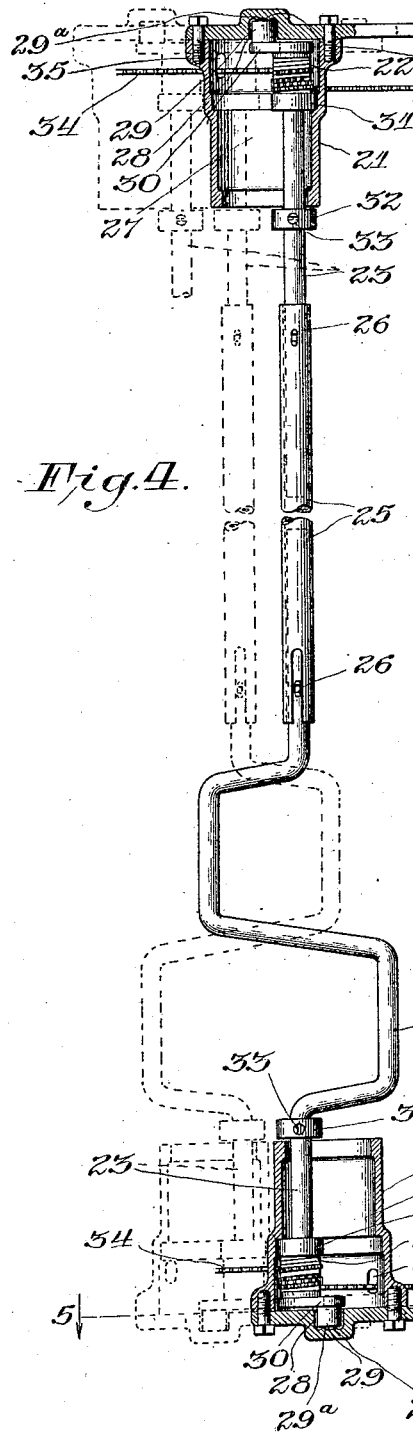
Fig. 4.
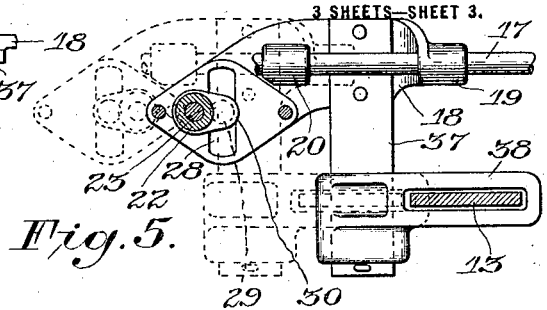
Fig. 5.
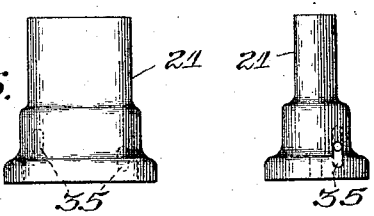
Fig. 6.  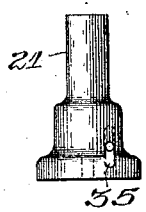 Fig. 7.
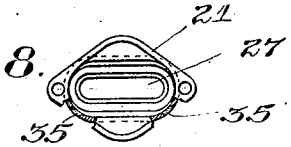
Fig. 8.
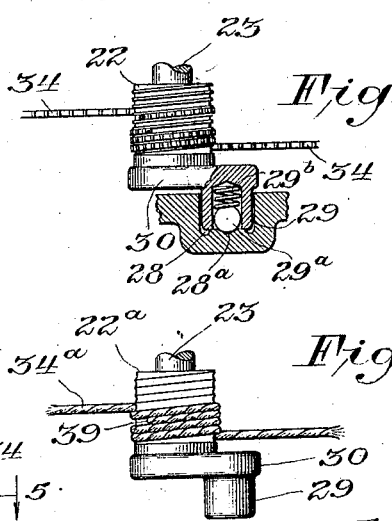
Fig. 9.
Fig. 10.
Inventor:
Robert Spurgin Jr.,
By Chas. E. Lord,
Atty.

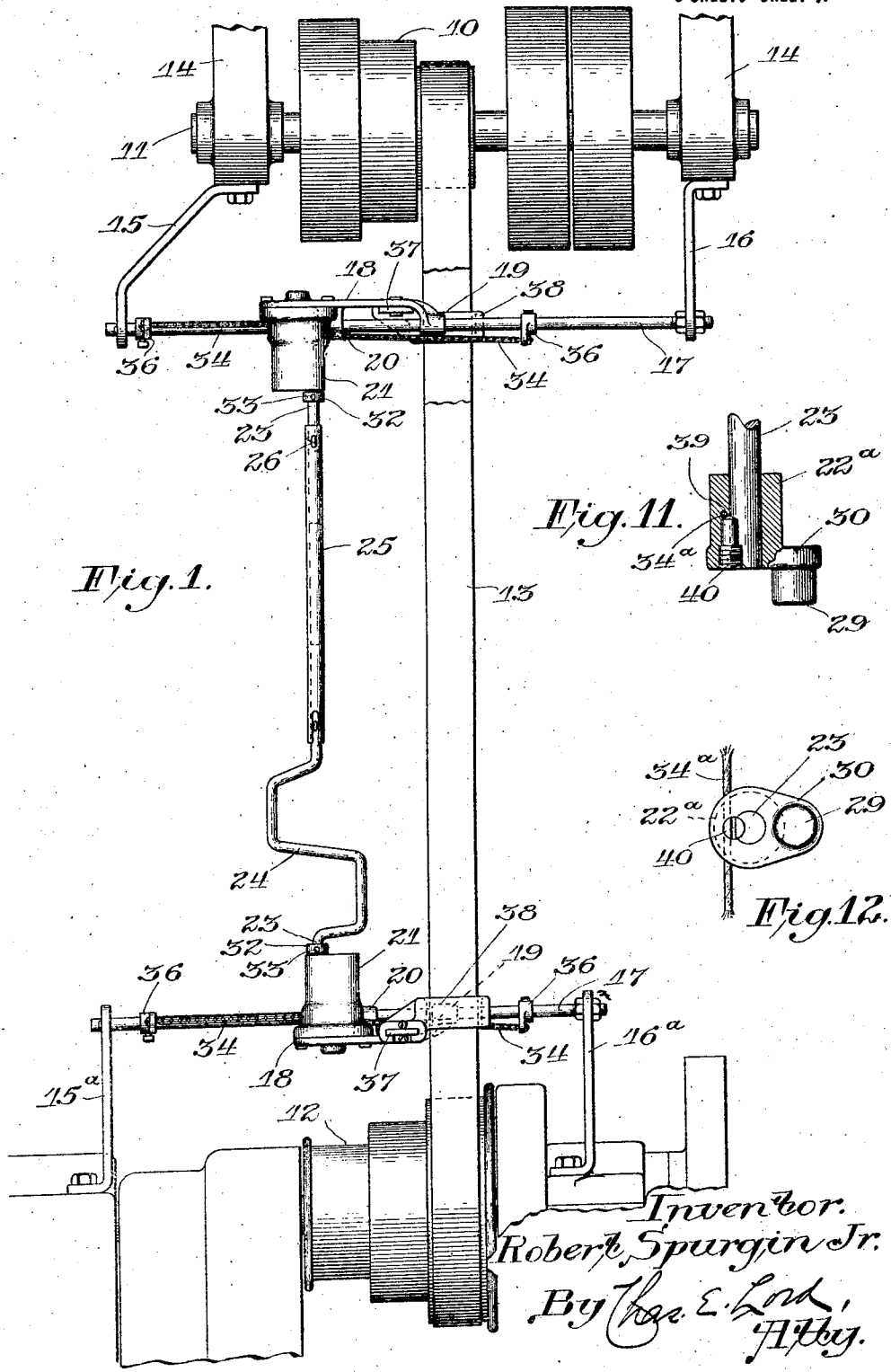

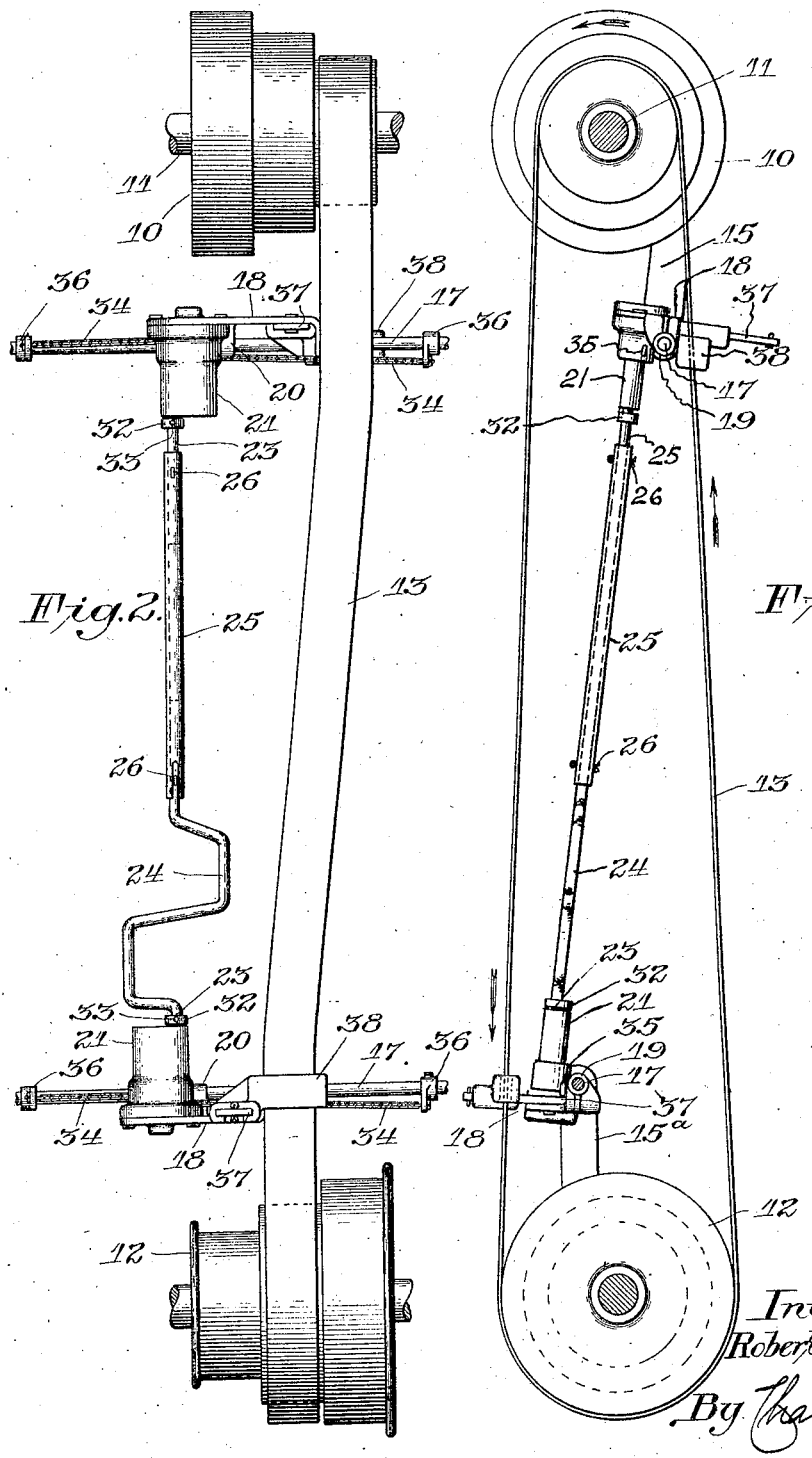

UNITED STATES PATENT OFFICE.

ROBERT SPURGIN, JR., OF CHICAGO, ILLINOIS.

BELT SHIFTER.

1,415,271.      Specification of Letters Patent.      Patented May 9, 1922.

Application filed February 23, 1918. Serial No. 218,872.

*To all whom it may concern:*

Be it known that I, ROBERT SPURGIN, Jr., a citizen of the United States, residing at Chicago, in the county of Cook and State of Illinois, have invented certain new and useful Improvements in Belt Shifters, of which the following is a full, clear, and exact specification.

This application relates to belt shifters, and more particularly those for cone stepped pulleys.

One object of this invention is to provide a belt shifter for shifting the belt on cone stepped pulleys, such as are ordinarily used for driving lathes.

Another object is to provide a belt shifter which is adapted to shift one end of the belt in advance of the other, the end first shifted being at all times the one which would step the belt down to a smaller step on the cone pulleys. The other end is then shifted to place the opposite end of the belt on the corresponding step of the other cone pulley, and of course means that the belt is stepped up to a larger step of this pulley. This order of shifting from the larger to the smaller step of the pulley, thereby loosening the belt, and then shifting to the next larger step of the other cone pulley, is maintained no matter which way the shifter is operated, or what its initial position happens to be.

Another object is to provide a belt shifter which is easy to operate, inexpensive to manufacture, and one which will not easily get out of order.

These and other objects are attained by the invention hereinafter described, reference being had to the accompanying drawings in which like reference numerals represent like parts throughout, and in which—

Figure 1 is a front elevation of my invention applied to the ordinary belt drive or lathe showing the belt in one of the driving positions;

Fig. 2 is the same except that some of the parts are broken away and the belt is shown in the first shifting position;

Fig. 3 is a side elevation of the same;

Fig. 4 is a front elevation of the operating shaft with the operating mechanism partly in section;

Fig. 5 is a horizontal section on the line 5—5 of Fig. 4;

Fig. 6 is a detail side elevation of the spool housing;

Figs. 7 and 8 are respectively, end elevation and a plan of the same;

Fig. 9 is a detail of the spool and crank adapted to use a chain;

Fig. 10 is a modification of the spool for use with a rope;

Figs. 11 and 12 are, respectively, a longitudinal section and a bottom plan view of this modification of the spool.

I have illustrated my device in connection with a cone pulley 10 mounted upon a counter shaft 11, operated with the corresponding cone pulley 12 on a speed lathe, the two cone pulleys being connected by means of a belt 13. The shaft 11 is supported by hangers 14 to which are fastened brackets 15 and 16 carrying a guide rod 17. In substantially the same way the lathe has attached thereto brackets $15^a$ and $16^a$ which carry in the same way another guide rod 17 similar to the one above. It will be noted at this point that the shifting mechanisms carried at the top and bottom by the two rods 17 are substantially the same, so the description of one applies to the other, and similar numerals are used for like parts on both.

The shifting mechanism comprises a carrier 18 having guides 19 and 20 slidably mounted upon the guide rod 17. To the carrier 18 is fastened a spool housing 21 in which is mounted a spool 22, the spool housing being capable of reciprocating movement with respect to the spool, as hereinafter explained. Each spool is mounted upon a shaft 23, the lower shaft, however, having a manually operable crank 24. The extensions of these shafts are fastened to a tube 25 by means of cotter pins 26, provision being made for adjustment. The spool housing 21 has a flat chamber 27 extending throughout its length, in which the spool 22 and shaft 23 are adapted to reciprocate. The flat portion of this chamber lies parallel to the guide rod 17. Communicating with the chamber is a transverse slot 28 in the carrier 18 which slidably receives a crank pin 29 on the crank 30, which is carried by the spool 22.

Referring now to Fig. 9, the crank pin 29 has an opening in which is carried a ball $29^a$ which is held against the bottom of the slot 28 in the carrier by a spring $29^b$. The ball is adapted to engage a depression $28^a$ which is located at a position of the crank corresponding to one of the working positions of the belt, thus locking the shifter in an operative position.

About the inner end of each spool 22 is fitted a collar 31 which slides in the spool housing 21. Another collar 32 is fastened to each shaft 23 by means of a set screw 33 to receive endwise thrust of the shaft. A flexible element 34 is wound a number of times about the spool and passes out through the spool housing through elongated holes 35. The ends of this element (which I have preferably shown as a chain), are secured to lugs 36 which are adjustably secured to the guide rods 17. On the carrier 18 is mounted an arm 37 and to this is adjustably secured a belt guide 38 having an opening through which the belt passes.

It will be noted from the arrows in Fig. 3 that the two shifting elements are placed upon opposite sides of the belt and so arranged that they engage the belt just before it reaches the pulley in each case. This is essential to causing the belt to shift.

In Fig. 10 a rope 34ª is shown upon a modification of the spool 22ª. The method of holding this rope as well as the spool upon the shaft is shown in Figs. 11 and 12 in which the rope 34ª passes through a hole 39 in the spool. The set screw 40 is so placed as to bite into the rope and at the same time act as a key to prevent the spool from turning upon the shaft.

In operation the machine is driven with the belt shifter in the position shown in Fig. 1. When it is desired to shift the belt, the shafts 23 are revolved by means of the crank 24. The first half revolution of the crank causes the lower carrier to be shifted to the first dotted position shown in Fig. 4. The changed position of the shafts and the tube 25 as here shown, is due to the fact that as shaft revolves the chain winds up upon one side of the spool 22 at the same time unwinding from the opposite side and thereby being propelled along the chain by a rolling motion.

It will be noted that the cranks 30 and crank pins 29 of the upper and lower shifting mechanisms are set diametrically opposite as respects the center of the operating shaft. The crank pin 29 is free to slide back and forth in the slot 28. The result is that as the spools revolve, the carrier at one end will not move forward for the first half revolution of the spool and its corresponding crank, while the other end will move forward twice the throw of its crank, and then on the next half revolution the carrier which moves forward on the first half revolution will stand still, while the other carrier will move forward a like amount. These two movements are illustrated in Fig. 4. On the first half of the revolution the upper carrier does not move while the lower carrier moves forward the width of one step and the belt is shifted to the next smaller step of the cone pulley as shown in Fig. 2. Then again, referring to Fig. 4, the next half revolution shifts the upper carrier as shown in dotted lines at the top of the figure, and the belt is shifted to the next larger size of the upper cone pulley.

In order to make this belt shifter applicable to cone pulleys of various widths of face, it is only necessary to substitute a different size spool and crank, the size of the spool and crank being such that one revolution of the spool will move the shifter the width of one step of the pulley. Variation in size of the spool is permitted because of the collar 31, which is placed between the spool and spool housing.

While I have shown and described a single form of my invention, it is to be understood that it is capable of many modifications. Changes, therefore, in the construction and arrangement may be made which do not depart from the spirit and scope of my invention as covered by the appended claims:

1. In a belt shifting mechanism, a guide member, an operating shaft, a carrier including a belt shifting element slidable on the guide member and transversely of the shaft, and manually operable means including a stationary flexible element for propelling the carrier along the guide member.

2. In a belt shifting mechanism, a guide member, an operating shaft, a carrier including a belt shifting element slidable on the guide member and transversely of the shaft, and manually operable means including a stationary flexible element and a drum for propelling the carrier along the guide member.

3. In a belt shifter, a guide member, a belt shifting element slidable on the guide member, an operating shaft having a drum fixed thereto and operatively connected with the belt shifting element, a flexible member secured to the guide member and cooperating with the drum whereby rotation of the shaft will propel the shifting element on the guide member.

4. A belt shifter for shifting belts on cone pulleys comprising belt shifting elements, an operating shaft associated with said elements, operating means connecting the shifting element and shaft for moving said elements alternately and intermittently and the shaft continuously across the face of the pulleys upon a uniform rotary movement of the shaft.

5. A belt shifter comprising belt shifting elements, an operating shaft associated with said elements, means for supporting said elements and shaft and manually operable means associated with the supporting means for imparting a continuous movement of translation to the shaft and alternate intermittent movements to said elements upon a uniform rotary movement of the shaft.

6. In a belt shifter, belt shifting elements, and manually operable means associated therewith including a stationary flexible element and a shaft for alternately shifting said elements and for continuously propelling the shaft at a uniform rate across the face of the pulleys on which the belt is shifted.

7. In a belt shifter, belt shifting elements, manually operable means including a flexible element and a shaft for continuously propelling the shaft across the face of the pulleys, and connections between the shaft and shifting elements for alternately shifting said elements and causing them to reciprocate with respect to the shaft.

8. In a belt shifter, a shaft, a belt shifting element, means for rotating the shaft, connections between the shaft and shifting element whereby the element will be periodically shifted on rotation of the shaft, and locking means between the shaft and shifting element for automatically locking the shifting element in shifted position.

9. A belt shifter comprising belt shifting elements, an operating shaft associated with said elements, means for supporting said elements and shaft, and operative connections between the shaft, shifting elements and supporting means for imparting an alternate discontinuous motion of translation to the shifting elements and a continuous motion of translation to the shaft upon rotation of the shaft.

10. A belt shifter comprising a belt shifting element, an operating shaft associated with said element, means for supporting said element and shaft, a drum on the shaft and a flexible element wound on the drum and fastened to a stationary member whereby a turning movement of the shaft will cause the belt shifting element to move.

11. A belt shifter comprising belt shifting elements, an operating shaft associated with said elements, means for supporting said elements, a drum on the shaft and a flexible element wound on the drum and fastened to the supporting means, whereby a turning movement of the shaft will cause the belt shifting elements to move.

12. A belt shifter comprising belt shifting elements, an operative shaft having cranks operatively engaging said elements, means for supporting said elements, a drum on the shaft and a flexible element wound on the drum and fastened to the supporting means, whereby a turning movement of the shaft will cause the belt shifting elements to move alternately.

13. In a belt shifter, a support, a carrier slidable on the support and having a belt engaging element, an operating shaft engaging the carrier, a drum on the shaft, flexible means engaging the drum and secured to the support, whereby rotation of the shaft will move the carrier intermittently to successive working positions of the belt and the shaft continuously along the support.

14. In a belt shifter, a support, a carrier slidable on the support and having a belt engaging element, an operating shaft having a crank engaging the carrier, a drum on the shaft, flexible means engaging the drum and secured to the support, whereby rotation of the shaft will move the carrier intermittently to successive working positions of the belt and the shaft continuously along the support.

15. In a belt shifter, a support, a carrier slidable on the support and having a belt engaging element, an operating shaft having a crank engaging the carrier, a drum on the shaft, flexible means engaging the drum and secured to the support, whereby rotation of the shaft will move the carrier intermittently to successive working positions of the belt and the shaft continuously along the support, locking means on the crank and carrier whereby the carrier is automatically locked when the belt is in a locking position.

16. In a belt shifter, a plurality of pulleys, a belt shiftable thereon to engage the different pulleys, a shifting element engaging the belt, a support for the shifting element, a rotatable member operatively engaging the shifting element, a flexible member engaging the rotatable member and secured to the support whereby rotation of the rotatable member will successively and intermittently shift the belt on the pulleys and move the rotatable member continuously along the support.

17. In a belt shifting device, a belt shifting element provided with a belt guide, a rotatable member having a crank engaging the belt shifting element, a fixed member supporting and guiding the shifting element and rotatable member, a flexible member engaging the rotatable member and secured to the fixed member, whereby a variable motion of translation will be imparted to the shifting element and a uniform motion of translation will be imparted to the rotatable member on rotation of the latter, and locking means carried by the crank for locking the shifting element when it attains its minimum motion.

In testimony whereof I affix my signature.

ROBERT SPURGIN, Jr.